Nov. 3, 1936.  P. PETRI  2,059,743
ELECTRICAL METER SYSTEM
Filed Jan. 18, 1935  3 Sheets-Sheet 1
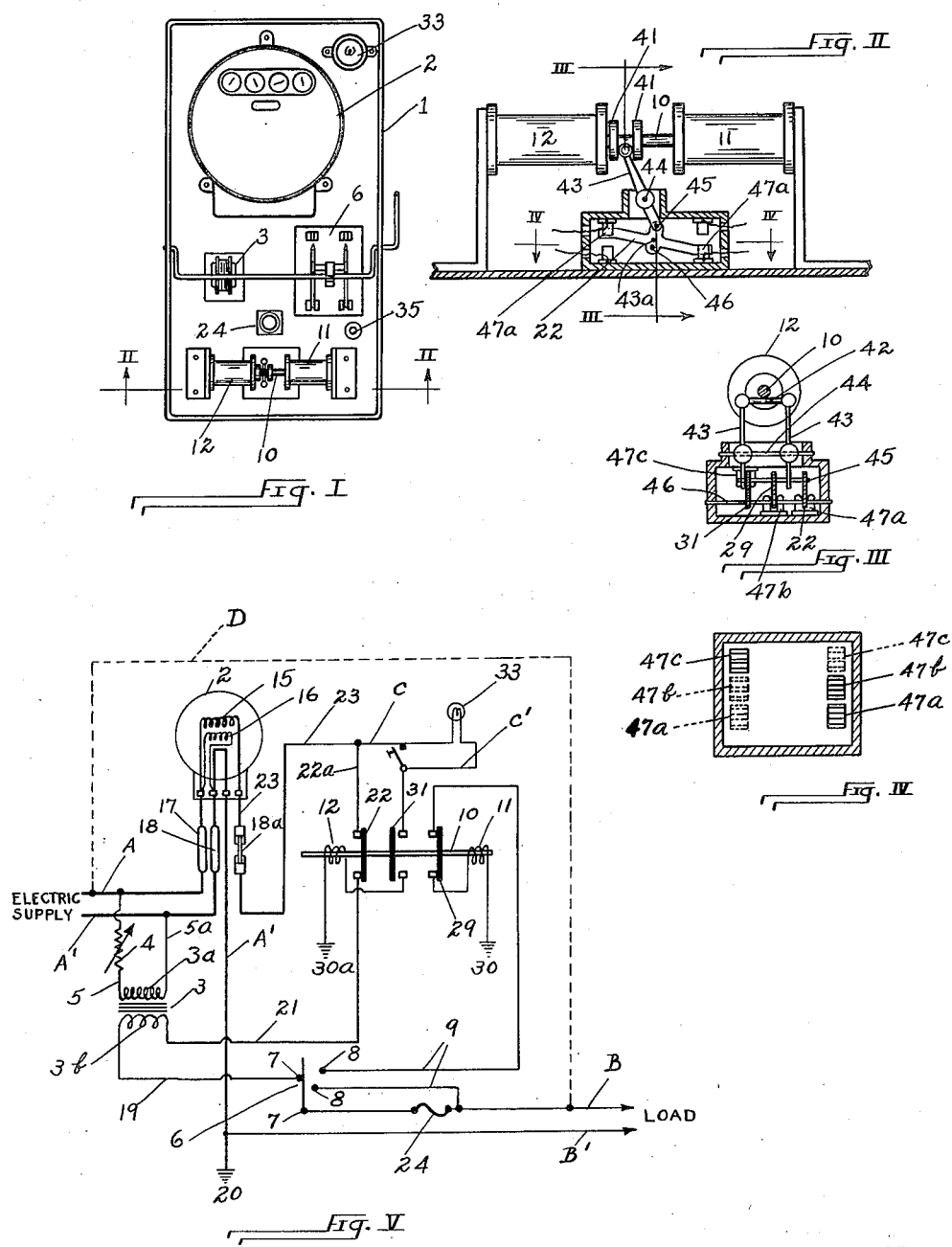

Nov. 3, 1936.          P. PETRI          2,059,743
ELECTRICAL METER SYSTEM
Filed Jan. 18, 1935          3 Sheets-Sheet 2
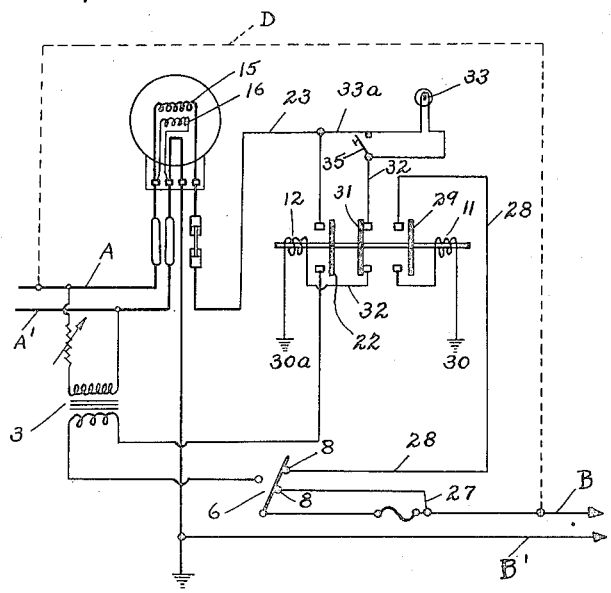
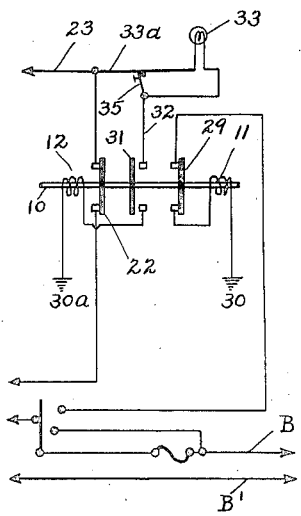
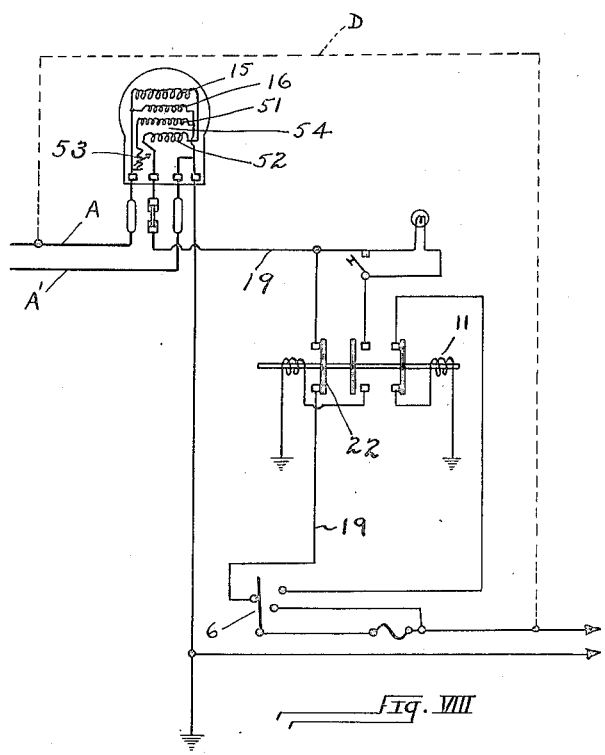
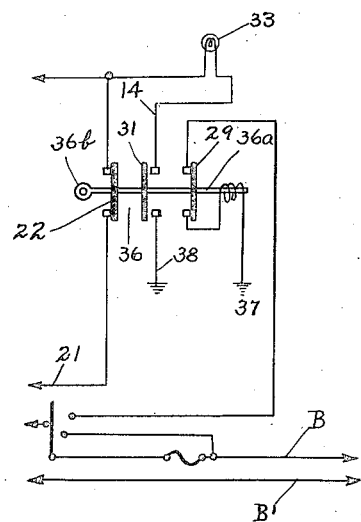
INVENTOR
Perfecto Petri
BY Christy and Wharton
ATTORNEYS.

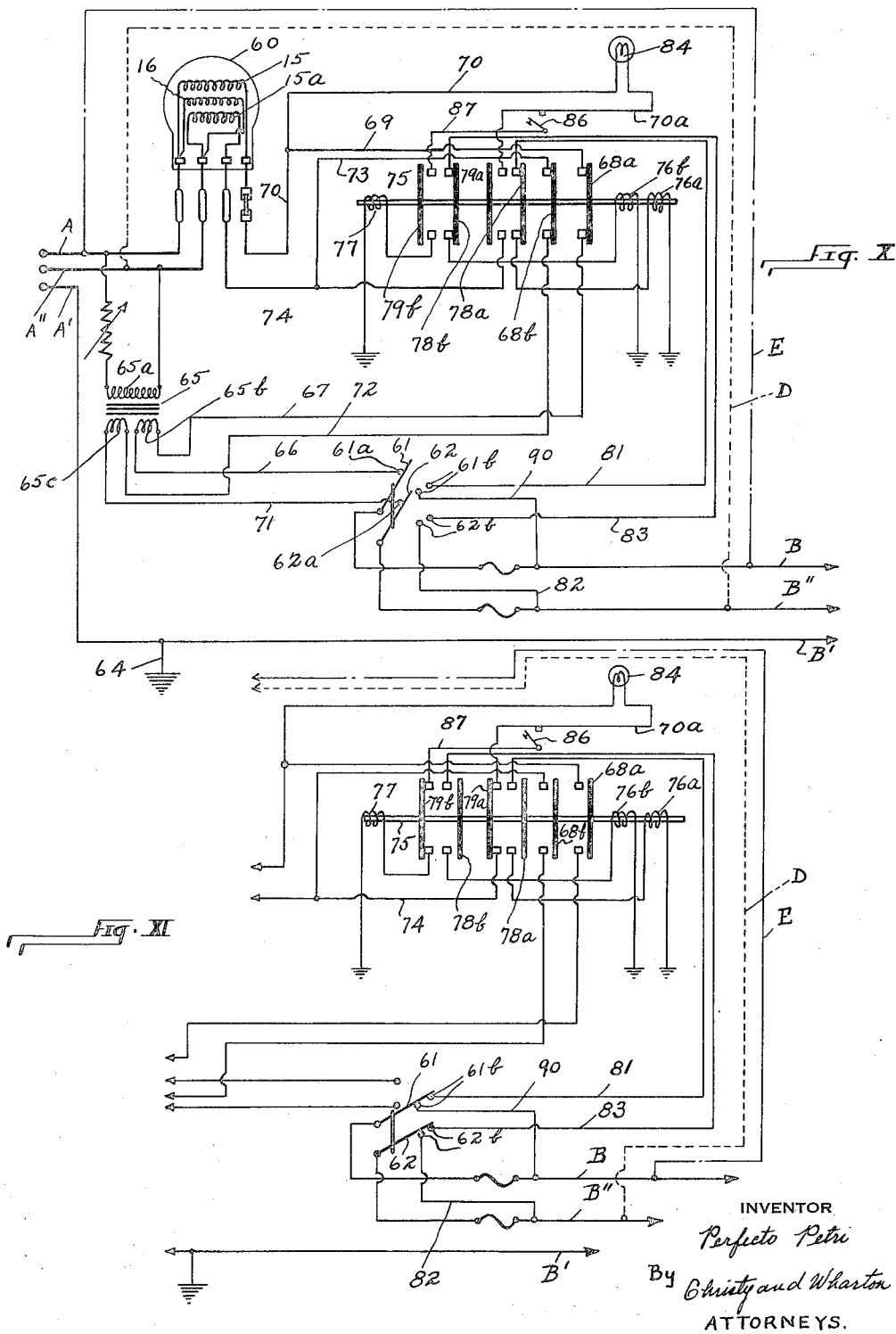

Patented Nov. 3, 1936

2,059,743

UNITED STATES PATENT OFFICE 2,059,743

ELECTRICAL METER SYSTEM

Perfecto Petri, New Kensington, Pa.

Application January 18, 1935, Serial No. 2,379

16 Claims. (Cl. 171—34)

This invention relates to an alternating current electric meter installation, constructed and arranged to obstruct and/or indicate the diversion of electrical energy, by obtaining the use of electrical energy, without proper registration by the meter, or by an improper registration of the meter.

The invention comprises means so arranged in conjunction with a meter for measuring the passage of electric energy to load, or service, that a consumer can neither obtain electrical power by "jumping", that is by shunting, the meter, without indicating the existence of a theft, nor can be unlawfully reduce the total measurement of the power utilized by producing a reversed action of the meter.

The invention also is such that the seller of the electrical energy may, if proper, penalize a dishonest user by causing an increased meter reading upon an attempted diversion of energy by jumping or shunting the meter.

It is not uncommon practice to mount electrical meters, which are placed in the locality of electrical energy utilization, in boxes which may be either locked or sealed, or both; to prevent tampering with the recording elements of the meter, or with the instrumentalities immediately adjacent the meter-recording elements, to thereby effect a theft of electrical power at the meter itself. As it is difficult to jump, or shunt, an electric meter with a switch positioned on the load side of the meter in its closed, or operative, position; mounting of such switch within the meter box tends to a large extent to discourage the diversion of electrical energy. It is, however, not impossible to jump, or shunt, the meter from without the meter box, and regardless of whether the main switch is in its open or closed position.

A primary and important object of this invention resides, therefore, in means adequately to prevent unrecorded use of electrical power, by shunting a meter properly inclosed in a locked or sealed meter box, whether its switch be in the "off" or in the "on" position.

The installation of this invention comprises, in close association and cooperation, instrumentalities which may be themselves sealed within the meter box, or otherwise themselves protectively mounted; and which are capable either of preventing, or indicating, diversion of current in such manner as to avoid proper meter registration, and are capable of preventing improper meter registration; whether the switch on the load side of the meter be in "off" or in "on" position.

In the accompanying drawings, Fig. I is a front elevation of an open meter box, showing the several elements of my theft-preventing equipment installed therein.

Fig. II is a side elevation, on an enlarged scale of the double acting, double solenoid, relay shown as an element of the combination in Fig. I, showing suitable switch elements associated with it.

Fig. III is a cross-sectional view through the double acting relay, taken on the plane III—III of Fig. II.

Fig. IV is a detail plan view of contacts suitably associated with a control relay of the installation, such as the relay shown in Figs. II and III of the drawings.

Fig. V is a wiring diagram of the meter installation of my invention, showing the main meter switch in its operative, or "on", position, and showing the application of a shunt, or jumper, applied to complete an active load circuit outside the meter box.

Fig. VI is a wiring diagram of the meter installation of my invention, showing the main meter switch in its inoperative, or "off" position, and showing the action of the protective assembly upon application of a shunt, or jumper, to complete a circuit around the meter box, when the main meter switch is in such "off" position.

Fig. VII is a fragmentary wiring diagram illustrating the restoration of the protective elements into their condition preceding the attempted theft, or diversion, and showing the restoration of a load circuit through the meter which has been interrupted by the attempted diversion, the restoration as shown in this figure of the drawings being electrically performed.

Fig. VIII is a wiring diagram of my protective system, but showing a modification in that a transformer, serving as one of the protective elements of the installation, is therein shown included in the meter proper, instead of included as an integral element mounted within the meter box.

Fig. IX is a fragmentary wiring diagram illustrating a modification in which the relay, constituting an important element of the protective assembly, is a single acting, single solenoid, relay, instead of a double solenoid relay as shown in each of the preceding figures of the drawings.

Fig. X is a wiring diagram showing a meter adapted to a three-wire system, and illustrating a modification in the protective assembly adapting it to the protection of an installation so arranged. This figure shows the two main meter switches in operative or "on" position, and illustrates the application of alternative shunt connections, or jumpers, to establish an illicit circuit around the meter box.

Fig. XI is a fragmentary wiring diagram of the same adaptation of the meter assembly to a three-wire system. This figure shows the two meter switches in their inoperative, or "off", position, and illustrates the action of the elements effective under such condition for preventing diversion of energy, under the influence of alternative shunt connections of jumpers.

Referring to Figs. I and V of the drawings, reference numeral 1 designates a meter which is arranged to be sealed, or locked, with the meter and its associated elements therein. It is to be understood initially that the locking, or sealing, of this box effectively prevents tampering with the mechanism of the meter itself, or with the elements directly associated with the meter. The use of some secure box of this type, or some generally equivalent means for protecting all the elements of the installation, is essential to the prevention of the diversion of energy, since otherwise any arrangement designed to prevent the diversion of energy might be easily rendered ineffective.

Within the meter box 1, and in association with the meter proper 2, there is a transformer 3 connected to the line A of the supply circuit A, A' to the meter, and a variable resistance 4 in the connection 5 from the suppply line A to the transformer.

The load circuit B, B' from the meter has therein a double-throw, two-pole, switch 6. This switch, when in its "on" position, completes the load circuit at contacts 7. When in its "off" position, breaking the load circuit, it makes contacts 8, establishing an auxiliary circuit 9 to the solenoid 11 of a double throw relay. Associated with the core 10 of the relay is a second, opposed, solenoid 12. The functioning of the relay will be hereinafter more fully described, but it may be here generally stated that it serves to make and break a circuit C, C' to an indicating light 33.

In the wiring diagram of Fig. V, the meter is shown diagrammatically, but is shown with sufficient particularity to illustrate the connections of the current coil 15 of the meter and the connections of the potential coil 16 of the meter. It is to be understood, however, that the arrangement and connections of the current coil 15, and potential coil 16, of the meter are as is usual in induction type electrical meters. The supply circuit A, A' is shown provided, as is usual, with meter-testing links 17 and 18. As is shown, the connection from the primary coil 3a of transformer 3 is by means of a connection 5, comprising variable resistance 4, to conductor A of the supply circuit; and the other terminal connection of the primary coil 3a of the transformer is through connecting wire 5a to the conductor A' of the supply circuit. The secondary coil 3b of the transformer has at one terminal a connecting wire 19 terminating at the load circuit contact 7 associated with the main meter switch 6.

As will be seen from this figure of the drawings, and as is usual construction in a meter of this type, the supply circuit conductors A, A' are connected through potential coil 16, and conductor A' is grounded at 20. Conductor B' of load circuit B, B' connects with supply conductor A'. In normal delivery of energy by way of the meter, therefore, the load circuit is established through the meter by way of the described connection through the current coil and also through the secondary coil of the transformer. In this connection it has been explained that conductor 19 is connected to one terminal of the transformer secondary. From the other terminal of the transformer secondary, a conductor 21 leads by way of switch 22, conductor 22a, and conductor 23, to the current coil 15 of the meter. Desirably, as shown, a test blade 18a is included in the conductor 23.

It may be here explained that transformer 3 acts as a booster transformer in the meter circuits. It is, however, so constructed and/or arranged that its boosting effect is limited. I prefer that it should not raise the voltage impressed upon the meter to any great degree.

As shown, a fuse, or fuses, 24 of usual type may be placed on the load side of the main meter switch 6. This fuse is without effect upon the protective operation of the apparatus to be hereinafter described.

In the normal operating condition of the meter, as shown in Fig. V of the drawings, all the special elements of my protective installation, save the transformer 3, are without function. In this connection it may be noted that the resistance 4 in the circuit 5, 5' to the primary coil 3a of the transformer limits input to the transformer, and therefore limits the inductive effect in the secondary coil 3b of the transformer.

I have shown in dotted lines in this figure of the drawings a shunt, or jump connector, which has been illicitly applied to interconnect interconnecting wire A of the supply circuit, outside and around the meter box 1, with the conductor wire B of the load circuit.

In this condition, with the shunt connector D applied, the boosting effect of the transformer 3 is to create a voltage, however slight, which affects the current coil of the meter. Registering operation is thus maintained in the meter, in spite of the attempt to shunt the meter. For example: if the voltage in the supply line be 110, and the transformer boosts the voltage by 3 volts, the voltage in the load circuit is 113 volts. If then, the shunt D be applied with the main switch of the system in the "on" position, there is a reverse current flow by way of the shunt, and by way of the current coil 15 and transformer 3.

It should be explained that current passed through the current coil of the meter, and maintaining registering operation of the meter, bears no relation to power consumption by way of the shunt. The potential difference being maintained by the transformer, registration of the meter is limited by the obstruction presented by resistance 4 in the transformer circuit. Inversely in accordance with the resistance thereby presented, the registration is increased, and may be either more or less than an accurate indication of power consumption in the load circuit.

Fig. VI of the drawings illustrates a condition in which the main meter switch has been opened, and a shunt, or jump connection D has then been made between the conductor A of the supply circuit and conductor B of the load circuit. Under such circumstances, means for indicating to an inspector that an abnormal condition exists are effective.

The means shown for effecting such indication comprise a relay, and switches and connections associated with it.

It will be seen that, in this condition, switch 6 bridges the contacts 8, so that current from shunt D, passing by way of conductor B of the load circuit, by way of its branch 27, contacts 8, conductor 28, and switch 29 in conductor 28 (considered in its closed position shown in Fig. V), energizes the solenoid 11 which is shown grounded at 30. Energization of solenoid 11 closes switch 31 in conductor 32 connected with the solenoid 12, thus completing a circuit including lamp 33 by way of conductor 32 to solenoid ground 30a. The other conductor of the circuit to lamp 33 is an extension 33a of conductor 23 which is in electrical communication with the current coil 15 of the meter. The making of electrical contact at switch 31, therefore, completes an indicating circuit from the current coil of the meter.

It should be understood that this lamp circuit is independent of, and additional to, the abnormal circuit created by electrical connection between conductors A and B, by the jump, or shunt connector D. The current in the lamp circuit is insufficient functionally to energize solenoid 12.

As soon as solenoid 11 becomes energized, it acts to produce the effect shown in Fig. VI, opening switch 29, and thereby breaking its own circuit connection. Simultaneously, with the closing of switch 31, switch 22 is opened by the energization of solenoid 11. This breaks the normal load circuit connection of the system, which has been explained in connection with Fig. V of the drawings.

After application of the shunt connector D, therefore, with the main switch 6 in the open position, the normal operating condition of the system cannot be restored by removal of the shunt connector. The situation is, therefore, that the meter cannot be operated normally, and that its abnormal condition is indicated by the lamp 33. It being necessary to obtain the services of a representative of the seller to open the meter box and restore normal conditions within the box, such representative of the seller is at once apprised of the abnormal conditions existing by the tell-tale lamp 33.

In order to restore normal conditions within the system, the authorized operator, having opened the meter box, operates a release switch 35 from open to closed position. Closing release switch 35 completes an active circuit through the solenoid 12, from conductor 33a and conductor 32, by way of switch 31, to the solenoid 12, to ground 30a. Relay 12, being adequately energized, acts to close switch 22 and open switch 31; and also acts to close switch 29, controlling the connection to the solenoid of relay 11. This action restores the normal condition of this portion of the assembly. Upon opening switch 35, the box may be relocked, and switch 6 thrown into its "on", or load circuit completing, position.

A suitable mechanical structure for the double-acting relay, and switches and contacts associated with it, is shown in Figs. I to IV, inclusive, of the drawings. Referring particularly to Fig. II, it will be seen that the core 10, common to both the solenoid 11 and the solenoid 12, has thereon a yoke in the form of spaced collars 41. In this yoke there lies a bar 42 interconnecting throwing levers 43 of a toggle switch. These levers are pivoted at 44, and are connected, by means of a cross shaft 45, with switch blades pivotally mounted on cross shaft 46. Three switch blades 31, 29, and 22 are shown arranged respectively to cooperate with the contact pairs 47a, 47b, and 47c.

Matching the structural features shown in Figs. I to IV with the wiring diagrams previously described, the relay is shown in its idle condition, that is, with both solenoids deenergized. In this condition, switches 29 and 22 are in their closed position, interconnecting contact pairs 47a and 47b, associated respectively with them. Switch blade 31 is in open position, in which it does not interconnect contacts 47c.

Upon energization of solenoid 11, moving core 10 to the right in Figs. I and II, switches 29 and 22 are brought into open position, and switch 31 is brought into closed position. It should be understood that a past-center spring, omitted for clearness of illustration, is mounted between the pivot 44 of the levers 43 and a point 43a on one of the switch blades intermediate the cross shafts 45 and 46, to assist in defining the two positions of relay core 10.

It should be obvious that the diversion preventing assembly, as shown in the above-described figures of the drawings, may be applied to a preformed meter. If desired, however, the transformer of the assembly may be incorporated as a part of the meter structure by winding coils, to act as a transformer, upon the frame which carries the meter coils. By constructing a meter initially in this manner, economy in manufacture may be obtained.

Fig. VIII of the drawings illustrates the use of a transformer having both its primary coil 51, and its secondary coil 52, wound upon the frame which carries the current coil 15 and the potential coil 16 of the meter. It also carries a variable resistance 53, which is identical in its connections with the variable resistance 4. In this arrangement, however, one terminal of the secondary coil 52 of transformer 54 connects directly with the current coil 15. The other terminal of the transformer secondary leads by way of a conductor 19, through switch 22, to the main meter switch 6. The remainder of the structure is identical with the showing of Figs. V to VII, inclusive.

The only difference in structure of this assembly is in the modified transformer mounting, and in the positioning of switch 22 in the conductor leading from the secondary transformer coil to the main switch, rather than in the conductor leading from the secondary transformer coil to the current coil of the meter. There is no functional difference, since opening of switch 22 upon energization of solenoid 11 breaks the load circuit connection of the system.

Because of the boosting effect in the transformer, creating in the system a higher potential at the load side of the meter, the meter is protected against attempts to run the meter in a reverse direction, by attempted reversal of flow of current through the meter.

Fig. IX of the drawings shows a modification in which the artificial load circuit, established when the meter is shunted with the switch in the "off" position, is controlled by a single-acting relay 36. The switch arrangement is as shown in the preceding figures of the drawings, and the solenoid of relay 36 is grounded at 37. A ground connection 38 to a contact of switch 31 is, however, added.

The action of the elements in establishing the indicating lamp circuit is closely similar to that described in connection with Fig. VI of the drawings. Upon energization of the solenoid of relay 36, switch 29 is opened to deenergize the relay. The momentary energization of the solenoid of relay 36, however, acts to close switch 31 and to open switch 22. This establishes a ground for the indicating lamp circuit by way of conductor 14, switch 31, and ground connection 38.

To reset this portion of the system, core 36a of relay 36 is provided with a handle 36b, and manual shifting of relay core 36a serves to open switch 31, to close switch 29, and also to close switch 22.

Figs. X and XI of the drawings show a three-wire system and a meter appropriate to a three-wire system, with my protective installation, as modified to conform to such conditions, associated with the meter. In this arrangement the supply circuit comprises the conductors A, A', and A''. The conductor A'' is in connection with a current coil 15a at the meter 60, additional to the current coil 15. The meter 60 comprises a potential coil 16, similar to that of the meter described in connection with a two-wire system.

There are in this three-wire system two main meter switch blades 61 and 62, controlling, respectively, load circuits B, B', and B'', B'. The meter switch blade 61 acts either to make contact at 61a, to complete load circuit B, B', or acts to interconnect contacts 61b. Switch blade 62 acts either to make contact at 62a, to complete load circuit B'', B, or serves to interconnect contacts 62b.

It will be understood that, since this is a three-wire system, the meter may be shunted either by running a jumper D from conductor A to conductor B, or by running a jumper E from conductor A'' to conductor B''. It is necessary, therefore, to provide means forestalling, or indicating, theft of current by either of such shunt connections.

In this arrangement a transformer 65, having a primary 65a, has two secondary coils 65b and 65c. Secondary transformer coil 65b is connected to main switch contact 61a by means of a conductor 66 from one of the coil terminals. From the other terminal of the coil, a wire 67 leads by way of a switch 68a, corresponding to the switch 22 of the two-wire system, and by way of conductors 69 and 70, to the current coil 15 of the meter. Secondary transformer coil 65c has one of its terminals in communication with contact 62a by way of conductor 71. Its other terminal is in communication, by way of conductor 72, with a switch 68b, which also corresponds to switch 22 of the two-wire system; and by way of conductors 73 and 74, with the current coil 15a of the meter.

If, then, either shunt connection D, or shunt connection E, be applied, the effect is identical with the effect described in connection with the two-wire system, since the completion of either of the shunt circuits is ineffective wholly to deenergize the meter, because of the voltage component created at the transformer serving in the manner previously described to maintain operation of the meter.

Whereas, in Fig. X of the drawings, blades 61 and 62 of the main meter switch were shown as making contact at 61a and 62a, respectively, in Fig. XI of the drawings they are shown as respectively interconnecting the contact pairs 61b and 62b. This being the "off" position of the main meter switch, the condition in the system is analogous to that described in connection with Fig. VI of the drawings, if the jumper D be applied to complete a bridging circuit to load conductor B, or if a jumper E be applied to complete a shunt circuit at the load conductor B''.

As shown both in Figs. X and XI of the drawings, core 75 of the double-acting relay has associated with it two solenoids 76a and 76b, both of which serve to move the relay core in the same direction. Opposed to them is the resetting solenoid 77, which serves to move the relay core 75 in the opposite direction. There are, controlled by the core of the relay, two switches 78a and 78b, both corresponding to the switch 29 of the two-wire installation, and two switches 79a and 79b, both of which correspond to the switch 31 of the two-wire installation.

If the jumper D be applied, a circuit is completed by way of the contact 61b, branch 90 from load wire B, and wire 81 leading to switch 78a, to complete a circuit through solenoid 76a. This shifts core 75 of the relay to the right, as shown in the drawings, moving the various switches from their positions shown in Fig. X of the drawings to their positions as shown in Fig. XI of the drawings.

Similarly, if the jumper E be applied, a circuit is completed at the contacts 62b from load wire B'', through branch connection 82 and conducting wire 83 from this load wire by way of switch 78b through solenoid 76b. This in identical manner shifts core 75 of the relay to the right, as viewed in the drawings and serves similarly to change the switches from the position in which they are shown in Fig. X to the position in which they are shown in Fig. XI.

It will be observed that in either instance energization of one of the solenoids 76a or 76b immediately opens the switches 78a and 78b associated with both of them, and also opens the switches 68a and 68b, which interconnect the two secondary coils of the transformer with the two current coils of the meter. In the same manner as that in which the load circuit is broken at switch 22 in the two-wire installation, the load circuit is in this installation broken in both the conductors. It is, therefore, impossible to restore the system to operative condition by moving the main meter switch into its "on" position, even though the jumper, which may be either the jumper D or the jumper E, be previously removed.

Shifting of the relay core 75, which opens switches 78a, 78b and 68a and 68b, closes switches 79a and 79b. By way of switch 79a, a circuit is completed between current coil 15 connected with conducting wire 70, and current coil 15a by way of conducting wire 74. This circuit is shown as including a tell-tale lamp 84, indicating that there has been tampering with the passage of energy through the meter.

The resetting means shown are generally similar to those shown in connection with the two-wire installation. These resetting means comprise a switch 86 in the wire 70a, which forms the portion of the lamp circuit lying between lamp 14 and switch 79a. One terminal of this switch 68, however, is connected with a wire 87, which leads to a contact of switch 79b, which has been closed by shifting core 75 of the relay to the right. Closing switch 86, therefore, connects the solenoid 77 of the relay in the indicator circuit and energizes this solenoid. Energization of solenoid 77 shifts solenoid core 75 to the left, and restores the switches to the position shown in Fig. X. In this position the normal load circuits through the meter are reestablished.

It should be understood that, if desired, a relay arranged for manual resetting, and corresponding generally to the relay arrangement shown in Fig. IX of the drawings, may be used in conjunction with the three-wire system to replace the resetting relay shown in Figs. X and XI of the drawings.

It will be noted that in Figs. X and XI the indicating lamp circuit is not completed by connection to ground. A ground connection is unnecessary in the three-wire system, since by establishing the return circuit to one of the current coils of the meter registering operation of the meter is maintained. It is of course possible, however, to effect mere energization of the indicating lamp by making a suitable ground connection for the lamp circuit.

It is to be understood that many variations in the specific instrumentalities, as herein shown or described, may be made, without departing from the spirit of the present invention. For example, the form of the switch and switch-operating means may be substantially changed, without in substance altering the functioning of the system.

Throughout the specification and drawings a variable resistance has been shown and described in the circuit to the transformer primary. This has been done to illustrate the fact that, by using a resistance, a transformer of the least specialized type may be used. If, however, there be used a transformer of such design as to have current-limiting characteristics, which is therefore of limited boosting effect, the added resistance may be eliminated.

I claim as my invention:

1. In combination with an alternating current meter for measuring the delivery of electrical power comprising a coil, a supply circuit in electrical communication with the coil of the meter, a load circuit comprising a conductor in electrical communication with the coil of the meter, and a transformer effective in said conductor; whereby upon application of a bridge conductor around the meter with the load circuit uninterrupted the coil of the meter remains subject to current directed thereto by a voltage effect created at the transformer.

2. In combination with an alternating current meter for measuring the delivery of electrical power comprising a current coil, a supply circuit in electrical communication with the current coil of the meter, a load circuit comprising a conductor in electrical communication with the current coil of the meter, and a voltage modifying transformer means in said conductor; whereby upon application of a bridge conductor around the meter with the load circuit uninterrupted the coil of the meter remains subject to current directed thereto by a voltage effect created at the transformer.

3. In combination with an alternating current meter for measuring the delivery of electrical power comprising a current coil, a supply circuit in electrical communication with the current coil of the meter, an electrical load conductor in communication with the current coil of the meter, and a transformer having one coil thereof in said load conductor and its other coil in electrical communication with the supply circuit to the meter; whereby upon establishment of a bridge conductor around the meter with the load circuit uninterrupted the current coil remains subject to current directed thereto by a voltage effect created at the transformer.

4. In combination with an alternating current meter for measuring the delivery of electrical power comprising a current coil, a supply circuit in electrical communication with the current coil of the meter, a load circuit comprising a conductor in electrical communication with the current coil of the meter, a load circuit switch arranged to complete and to interrupt the load circuit, a normally incomplete indicator circuit having electrically operable indicating means therein, a branch circuit from load terminally associated with the load circuit switch and arranged to be completed by load interrupting position of said switch, and electrical means in said branch circuit and arranged to act under electrical energy derived by a bridge around the meter from the supply circuit to the load circuit to complete the said indicator circuit.

5. In combination with an alternating current meter for measuring the delivery of electrical power comprising a current coil, a supply circuit in electrical communication with the current coil of the meter, a load circuit comprising a conductor in electrical communication with the current coil of the meter, a load circuit switch arranged to complete and to interrupt the load circuit, a normally incomplete indicator circuit, having electrically operable indicating means therein, a branch circuit from load terminally associated with the load circuit switch and arranged to be completed by load interrupting position of said switch, electrical means in said branch circuit and arranged to act under energy derived by a bridge around the meter from the supply circuit to the load circuit to complete the said indicating circuit, and a switch in the load circuit conductor communicating with the current coil arranged to be opened by the said electrical means additionally to interrupt the load circuit upon completion of the said indicator circuit.

6. In combination with an alternating current meter for measuring the delivery of electrical power comprising a current coil, the combination of a supply circuit in electrical communication with the current coil of the meter, a load circuit comprising a conductor in electrical communication with the current coil of the meter, a normally incomplete indicator circuit having electrically operable indicating means therein, a switch adapted to complete or interrupt the load circuit at said load circuit conductor, a transformer having one coil thereof in electrical communication with the supply circuit and the other coil thereof in the load circuit conductor to introduce into the system a differential component of voltage, electrically responsive means controlling said normally incomplete indicator circuit and arranged when energized to complete said indicator circuit, and a branch circuit in communication with the load circuit and with said electrically responsive means associated with the load circuit switch and arranged to be completed thereby in circuit interrupting position of said switch to energize said electrically responsive means to complete said indicator circuit.

7. In combination with an alternating current meter for measuring the delivery of electrical power comprising a current coil, the combination of a supply circuit in electrical communication with the current coil of the meter, a load circuit comprising a conductor in electrical communication with the current coil of the meter, a normally incomplete indicator circuit having electrically operable indicating means therein, a switch adapted to complete or interrupt the load circuit at said load circuit conductor, a transformer having one coil thereof in electrical communication with the supply circuit and the other coil thereof in the load circuit conductor to introduce into the system a differential component of voltage, electrically responsive means controlling said normally incomplete indicator circuit and arranged when energized to complete said indicator circuit, a branch circuit in communication with the load circuit and with said electrically responsive means associated with the load circuit switch and arranged to be completed thereby in circuit-interrupting position of said switch to energize said electrically responsive means thereby to cause completion of said indicator circuit, and a secondary switch in the load circuit conductor arranged to be opened by the said electrical means additionally to interrupt the load circuit upon completion of the said indicator circuit.

8. In combination with an alternating current meter for measuring electrical power delivery comprising a current coil, and supply and load circuits to and from the meter; a load circuit conductor in communication with the current coil of the meter, a branch conductor from said load circuit conductor constituting an incomplete indicator circuit having indicating means therein, voltage regulating means in said load circuit conductor, electrical means arranged to cause completion of the incomplete indicator circuit, and a switch in said load circuit conductor arranged in one alternate position to maintain electrical communication between the load circuit and the current coil of the meter by way of said voltage modifying means and in another alternate position to establish electrical communication between the load circuit and said electrically operable means.

9. In combination with an alternating current meter for measuring electrical power delivery comprising a current coil, and supply and load circuits to and from the meter; a load circuit conductor in communication with the current coil of the meter, a branch conductor from said load circuit conductor constituting an incomplete indicator circuit having indicating means therein, voltage modifying means in said load circuit conductor, electrical means arranged to cause completion of the incomplete indicator circuit, a switch in said load circuit conductor arranged in one alternate position to maintain electrical communication between the load circuit and the current coil of the meter by way of said voltage modifying means and in another alternate position to establish electrical communication between the load circuit and said electrically operable means, and a secondary switch in the said load circuit conductor arranged to be opened to interrupt the load circuit by action of said electrically operable means in completing the branch indicator circuit.

10. In combination with an alternating current meter for measuring the delivery of electrical power having associated therewith means to create a differential component of voltage in the system at the load side of the meter; a load circuit, a normally incomplete indicator circuit, a magnet arranged to act upon energization to complete said circuit, and a load circuit switch arranged in its load circuit interrupting position to establish electrical communication between said magnet and the load circuit at the load side of said switch.

11. In combination with an alternating current meter for measuring the delivery of electrical power having a supply circuit and a load circuit leading respectively thereto and therefrom; means for effecting indication of the delivery of electrical power irrespective of delivery of the power through a jumper connection by-passing the meter comprising a transformer electrically effective at the load side of the meter to modify voltage in the system, and a solenoid controlled circuit having electrically operable indicating means therein and arranged to be energized from the load side of the meter upon connection of a by-passing jumper around the meter.

12. In combination with an alternating current meter for measuring the delivery of electrical power and having a supply circuit and a load circuit leading respectively thereto and therefrom; means comprising a transformer electrically effective at the load side of the meter and capable of imposing a voltage differing from that at the supply side of the meter, and a circuit breaking solenoid connected and arranged to receive load circuit power upon by-passing of the meter by means of a jumper from the said supply circuit to the said load circuit and as so energized to break the load circuit.

13. The combination of claim 12 comprising additionally means connected and arranged to maintain the load circuit broken upon deenergization of said circuit breaking solenoid upon removal of a jumper by means of which it has been energized to break the load circuit.

14. The combination of claim 12 comprising additionally means adjustable to vary to a predetermined extent the voltage modifying effect of the said transformer.

15. In combination with an alternating current meter for measuring the delivery of electrical power having a supply circuit and a load circuit leading respectively thereto and therefrom; means for indicating the delivery of electrical power irrespective of delivery of the power through a jumper connection by-passing the meter comprising a transformer electrically effective at the load side of the meter to modify voltage in the system, and an electrically controlled circuit having electrically operable indicating means therein and arranged to be energized from the load side of the meter upon connection of a by-passing jumper around the meter.

16. In combination with an alternating current meter for measuring the delivery of electrical power having associated therewith means for creating a differential component of voltage in the system at the load side of the meter; a load circuit, a normally incomplete indicator circuit, electrically responsive means arranged to act upon energization to complete said circuit, and a load circuit switch arranged in its load circuit interrupting position to establish electrical communication between said electrically responsive means and the load circuit at the load side of said switch.

PERFECTO PETRI.